(12) United States Patent
Usui

(10) Patent No.: US 9,592,729 B2
(45) Date of Patent: Mar. 14, 2017

(54) FUEL TANK

(75) Inventor: Takayuki Usui, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 96 days.

(21) Appl. No.: 13/884,582

(22) PCT Filed: Nov. 17, 2010

(86) PCT No.: PCT/JP2010/070455
§ 371 (c)(1),
(2), (4) Date: May 9, 2013

(87) PCT Pub. No.: WO2012/066648
PCT Pub. Date: May 24, 2012

(65) Prior Publication Data
US 2013/0220999 A1    Aug. 29, 2013

(51) Int. Cl.
*B60K 15/035* (2006.01)
*B60K 15/03* (2006.01)
(Continued)

(52) U.S. Cl.
CPC .. *B60K 15/03504* (2013.01); *B60K 15/03177* (2013.01); *B60K 15/04* (2013.01);
(Continued)

(58) Field of Classification Search
CPC  B60K 15/03; B60K 15/03177; B60K 15/077; B60K 2015/03453; B62J 35/00; F02M 37/103
(Continued)

(56) References Cited

U.S. PATENT DOCUMENTS

| 4,919,103 A | 4/1990 | Ishiguro et al. |
| 5,458,373 A | 10/1995 | Scheurenbrand et al. |

(Continued)

FOREIGN PATENT DOCUMENTS

| CA | 2654102 A1 | 1/2008 |
| DE | 60017326 T2 | 6/2005 |

(Continued)

OTHER PUBLICATIONS

Office Action dated Jul. 14, 2014 for German Patent Application No. DE112010006005.3 (9 pages).

(Continued)

*Primary Examiner* — Anthony Stashick
*Assistant Examiner* — Madison L Poos
(74) *Attorney, Agent, or Firm* — Conley Rose, P.C.

(57) ABSTRACT

The fuel tank according to the present invention is a fuel tank including a fuel supply device for pressure-feeding fuel to an engine of a vehicle; a fuel vapor treating device configured to enable adsorption of fuel vapor; a fuel tank body which stores the fuel; and a cover material which blocks an opening portion formed in the fuel tank body, wherein an inlet portion to which an inlet pipe for guiding the fuel from a fueling port to the fuel tank body is connected is fixed to the cover material in a state of penetrating the cover material, and a pipe and a wire of the fuel supply device and pipes of the fuel vapor treating device are further fixed to the cover material in a state of penetrating the cover material.

11 Claims, 7 Drawing Sheets

(51) Int. Cl.
*B60K 15/04* (2006.01)
*F02M 37/10* (2006.01)
*F02M 25/08* (2006.01)

(52) U.S. Cl.
CPC .............. *B60K 2015/03453* (2013.01); *B60K 2015/03467* (2013.01); *B60K 2015/03514* (2013.01); *B60K 2015/0477* (2013.01); *F02M 25/089* (2013.01); *F02M 25/0854* (2013.01); *F02M 37/106* (2013.01)

(58) Field of Classification Search
USPC ................ 220/4.12, 4.14, 562; 206/0.6, 0.7; 123/519
See application file for complete search history.

(56) References Cited

U.S. PATENT DOCUMENTS

| | | | |
|---|---|---|---|
| 5,746,186 | A | 5/1998 | Kidokoro |
| 5,901,689 | A * | 5/1999 | Kimura et al. ............... 123/518 |
| 6,298,540 | B1 | 10/2001 | Benjey et al. |
| 6,354,280 | B1 * | 3/2002 | Itakura ............. B60K 15/03504 123/198 D |
| 6,609,503 | B1 | 8/2003 | Nakagawa et al. |
| 2002/0125254 | A1 * | 9/2002 | Hagano et al. ............... 220/562 |
| 2003/0168853 | A1 | 9/2003 | Mueller et al. |
| 2006/0032663 | A1 * | 2/2006 | Hosoya ........................ 174/151 |
| 2006/0225709 | A1 | 10/2006 | Washeleski et al. |
| 2007/0221674 | A1 * | 9/2007 | Mori et al. ................... 220/562 |

FOREIGN PATENT DOCUMENTS

| | | |
|---|---|---|
| EP | 0792767 A2 | 9/1997 |
| EP | 1081034 A2 | 3/2001 |
| GB | 2273476 A | 6/1994 |
| JP | 1982153841 | 9/1982 |
| JP | 64000347 | 1/1989 |
| JP | 1994012152 | 2/1994 |
| JP | 07223446 | 8/1995 |
| JP | 9236059 A | 9/1997 |
| JP | 2001138759 | 5/2001 |
| JP | 2004505797 A | 2/2004 |
| JP | 2004510090 A | 4/2004 |
| JP | 2005029100 A | 3/2005 |
| JP | 2008168766 | 7/2008 |
| JP | 2008168767 A | 7/2008 |
| JP | 2008174074 A | 7/2008 |
| JP | 2009542510 A | 12/2009 |
| WO | 0226514 A | 4/2002 |

OTHER PUBLICATIONS

PCT/JP2010/070455 International Search Report dated May 24, 2012 (2 p.).

* cited by examiner

FUEL TANK

TECHNICAL FIELD

The present invention relates to a fuel tank including a fuel supply device for pressure-feeding fuel to an engine of a vehicle, and a fuel vapor treating device configured to enable adsorption of fuel vapor.

BACKGROUND ART

A technique related to the fuel tank described above is disclosed in JP-A-2008-168766.

As illustrated in FIG. 9, the fuel tank is constituted by a fuel tank body 100, a fuel supply device 120 installed in the fuel tank body 100, and a fuel vapor treating device (illustration is omitted). The fuel tank body 100 is configured by joining an upper shell 101 and a lower shell 102 at the positions of flange portions 103 and 104 thereof.

In the left end portion of the upper portion of the upper shell 101, an inlet portion 101e to which an inlet pipe (illustration is omitted) for guiding fuel to the fuel tank body 100 from a fueling port is connected is provided to penetrate through the wall surface. In addition, in the upper surface of the upper shell 101, a vapor port 105p that communicates with a space in the fuel tank body 100 via a cut-off valve 105 is provided, and a vapor pipe of the fuel vapor treating device (illustration is omitted) is connected to the vapor port 105p.

Moreover, in the side surface of the lower shell 102, a pipe joint 123 to which a fuel press-feeding pipe 122 of the fuel supply device 120 is connected, and a connector 127 to which a power cable 124 of a motor of the fuel supply device 120 and a signal cable 125 of a liquid level sensor are connected are provided to penetrate through the wall portion.

In the fuel tank described above, the inlet portion 101e, the vapor port 105p, the pipe joint 123, and the connector 127 are provided at different positions, and thus through-holes (illustration is omitted) need to be formed at the corresponding positions in the wall portion of the fuel tank body 100. Therefore, sealing needs to be performed at the corresponding positions of the inlet portion 101e, the vapor port 105p, the pipe joint 123, the connector 127, and the like.

As such, since the sealing points are distributed, reliability of the fuel tank against fuel leakage is reduced, and cost is increased due to the need for sealing at a plurality of points.

There has been a need for improved fuel tank to enhance reliability of a fuel tank and achieve reduction in cost by integrating sealing points of a fuel tank body into a single point.

BRIEF SUMMARY OF THE INVENTION

In a first aspect of this disclosure, a fuel tank includes: a fuel supply device for pressure-feeding fuel to an engine of a vehicle; a fuel vapor treating device configured to enable adsorption of fuel vapor; a fuel tank body which stores the fuel; and a cover material which blocks an opening portion formed in the fuel tank body, wherein an inlet portion to which an inlet pipe for guiding the fuel from a fueling port to the fuel tank body is connected is fixed to the cover material in a state of penetrating the cover material, and a pipe and a wire of the fuel supply device and the fuel vapor treating device are further fixed to the cover material in a state of penetrating the cover material. In addition, the pipe and wire also include ports and the like besides a pipe joint and a connector.

According to this aspect, the pipe and the wire of the fuel supply device and the fuel vapor treating device are fixed to the cover material provided with the inlet portion in a state of penetrating the cover material. Therefore, sealing between the joining portion between the opening portion of the fuel tank body and the cover material, and the portion of the cover material penetrated by the pipe and wire can be performed. That is, sealing points are integrated into one point of the opening portion. Therefore, compared to a case where a plurality of sealing points are distributed as in the related art, reliability of the fuel tank is enhanced, and reduction in cost can be achieved.

According to a second aspect of this disclosure, a size of the opening portion of the fuel tank body is formed to be a size through which a component mounted into the fuel tank body passes, and the cover material is configured to be demountable from the opening portion and re-mountable thereto.

Therefore, replacement of components in the fuel tank body can be performed using the opening portion, and thus an opening for maintenance does not need to be particularly provided.

According to a third aspect of this disclosure, a remaining fuel amount detecting device included in the fuel supply device is installed in the fuel tank body, and a signal line of the remaining fuel amount detecting device is included in the wire of the fuel supply device.

According to a fourth aspect of this disclosure, an entirety of the fuel supply device is installed in the fuel tank body.

According to a fifth aspect of this disclosure, the fuel supply device is mounted to a device mounting portion formed on an inner wall surface of the fuel tank body by an engaging mechanism.

Therefore, mounting of the fuel supply device to the fuel tank body is facilitated.

According to a sixth aspect of this disclosure, the fuel vapor treating device is disposed in the fuel tank body.

According to a seventh aspect of this disclosure, a part of a container of a canister included in the fuel vapor treating device is molded integrally with a wall portion of the fuel tank body.

Therefore, reduction in manufacturing cost of the fuel pump can be achieved.

According to an eighth aspect of this disclosure, the fuel tank body is constituted by an upper shell and a lower shell, and the fuel supply device and the fuel vapor treating device are mounted to the upper shell.

That is, since the fuel supply device and the like are not mounted to the lower shell, the shape of the lower shell can be relatively freely set. Therefore, fuel tanks having different shapes can be easily manufactured.

According to a ninth aspect of this disclosure, the upper shell and the lower shell are resin injection-molded products.

Therefore, the upper shell and a part of the fuel vapor treating device can be integrally molded, or the lower shell and a part of the fuel supply device can be integrally molded.

According to the this disclosure, since the sealing points of the fuel tank body are integrated into one point, reliability of the fuel tank can be enhanced, and reduction in cost can be achieved.

DESCRIPTION OF EMBODIMENTS

Embodiment 1

Hereinafter, description of a fuel tank according to Embodiment 1 of the present invention will be provided on the basis of FIGS. 1 to 8. The fuel tank according to this embodiment is a fuel tank with a canister used in a vehicle.

<Summary of Fuel Tank 10>

Figure 1:
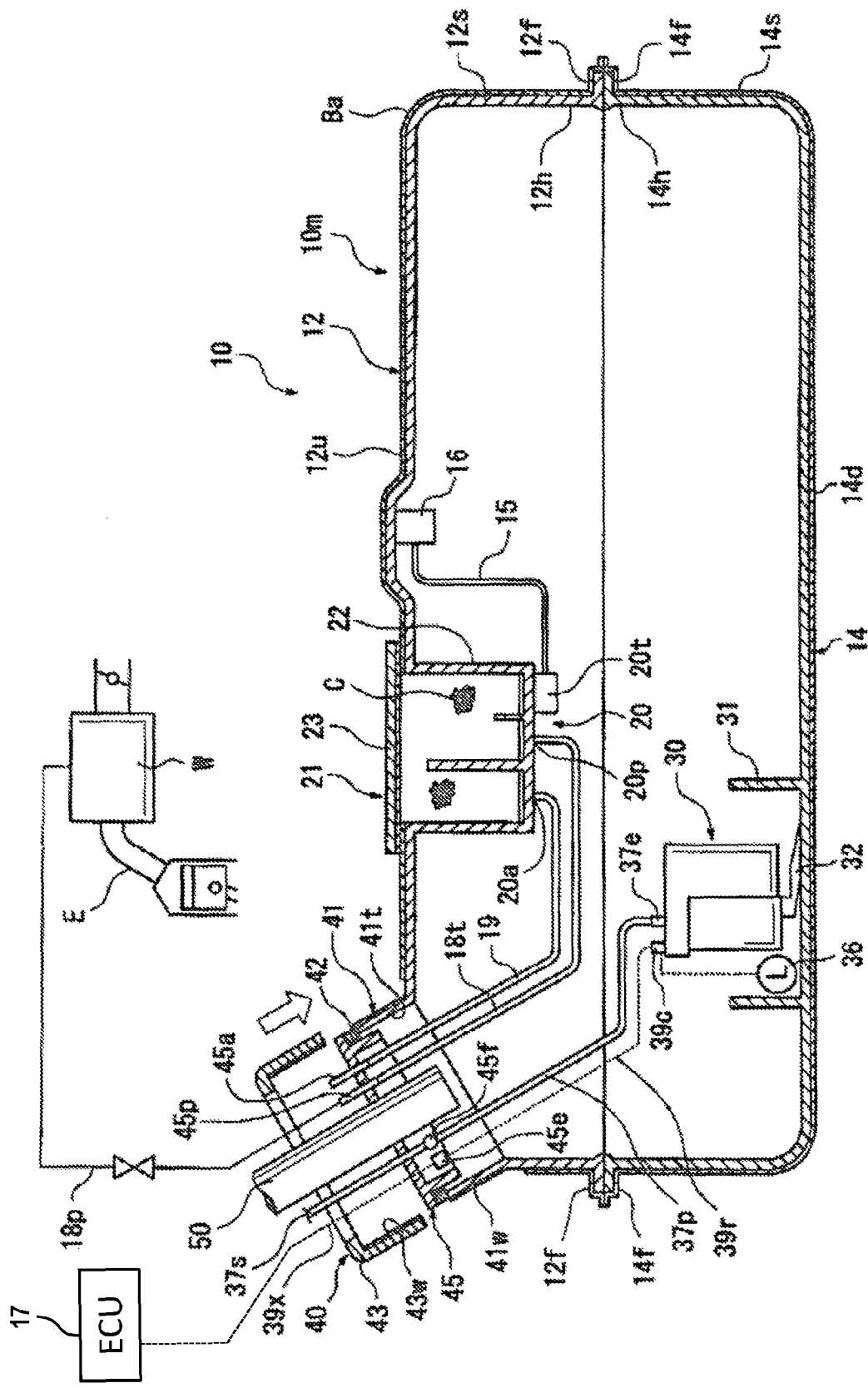
FIG. 1 is a schematic longitudinal cross-sectional view illustrating the configuration of a fuel tank according to Embodiment 1 of the present invention.

As illustrated in FIG. 1, a fuel tank 10 includes a tank body 10m constituted by an upper shell 12 and a lower shell 14. The upper shell 12 and the lower shell 14 are resin injection-molded products, and the surfaces thereof are covered with a barrier layer Ba having fuel permeation resistance. Here, as a resin that is a body material of the upper shell 12 and the lower shell 14, for example, high-density polyethylene (HDPE) is used, and as a material of the barrier layer Ba, an ethylene vinyl alcohol copolymer (EVOH) is used.

The upper shell 12 is formed by an upper plate portion 12u and a side plate portion 12s in a square container shape in which the lower side thereof is open, and a flange portion 12f is formed at the peripheral edge of a lower side opening 12h. In addition, as illustrated in FIG. 1, an opening portion 41 having a short pipe shape is formed at the corner portion between the upper plate portion 12u and the side plat portion 12s in the upper shell 12, and the opening portion 41 is configured to be opened and closed by an opening and closing mechanism 40. Furthermore, a container body 22 of a canister 20 is integrally molded at predetermined positions of the upper plate portion 12u of the upper shell 12.

The lower shell 14 is formed by a bottom plate portion 14d and a side plate portion 14s in a square container shape in which the upper side thereof is open, and a flange portion 14f is formed at the peripheral edge of an upper side opening 14h. In addition, a fuel supply device 30 for the pressure-feeding fuel to an internal combustion engine E is mounted onto the bottom plate portion 14d (bottom surface) of the lower shell 14.

In addition, the flange portion 14f of the lower shell 14 and the flange portion 12f of the upper shell 12 are joined to each other, thereby forming the fuel tank body 10m.

<Canister 20>

The canister 20 is configured to enable adsorption of fuel vapor which is generated in the fuel tank body 10m during parking of a vehicle (an engine stopped stated) and enable the adsorbed fuel vapor to be supplied to an intake pipe W of the engine E during operations. The canister 20 includes a sealed type container 21, and a container 21 is constituted by the container body 22 of an upside open type and a cover material 23 that blocks an upper portion opening of the container body 22.

The container body 22 is formed in a square convex portion shape at a predetermined position of the upper plate portion 12u of the upper shell 12, and the container body 22 is filled with an adsorbent C made of granular activated carbon or the like. In addition, the upper portion opening of the container body 22 filled with the adsorbent C is closed by the cover material 23.

In the bottom plate portion of the container body 22 of the canister 20, an atmosphere port 20a, a purge port 20p, and a tank port 20t including a bidirectional check valve are formed. In addition, the tank port 20t is connected to a cut-off valve 16 mounted to the ceiling portion of the fuel tank body 10m via a vapor pipe 15. The cut-off valve 16 is a valve that is closed by an overturning of a vehicle or the like and is typically held in an open stated.

The purge port 20p of the canister 20 is connected to a tank side purge port 45p provided in a cover material 45 (described later) of the opening and closing mechanism 40 via a purge pipe 18t. In addition, an outside purge pipe 18p that is able to communicate with the intake pipe W of the engine E is connected to the tank side purge port 45p.

In addition, the atmosphere port 20a of the canister 20 is connected to a tank side atmosphere port 45a provided in the cover material 45 (described later) of the opening and closing mechanism 40 via an atmosphere pipe 19. In addition, the tank side atmosphere port 45a is open to the air.

In the above-described configuration, for example, when the pressure of the fuel tank 10 becomes equal to or higher than a set pressure of the bidirectional check valve of the tank port 20t in a stopped stated of the engine E, the bidirectional check valve is opened and gas (fuel vapor+air) in the fuel tank 10 flows into the canister 20 through the cut-off valve 16, the vapor pipe 15, and the tank port 20t. In addition, the fuel vapor that flows into the canister 20 is adsorbed to the adsorbent C, and air from which the fuel vapor is removed diffuses to the outside via the atmosphere pipe 19 and the tank side atmosphere port 45a from the atmosphere port 20a.

In addition, when the inside of the intake pipe W has a negative pressure due to driving of the engine E, air flows into the canister 20 from the tank side atmosphere port 45a, the atmosphere pipe 19, and the atmosphere portion 20a of the canister 20, and the fuel vapor adsorbed to the adsorbent C is purged. In addition, the fuel vapor is suctioned into the intake pipe W of the engine E via the purge port 20p of the canister 20, the purge pipe 18t, the tank side purge port 45p, and the outside purge pipe 18p along with the air.

<Fuel Supply Device 30>

Figure 3:
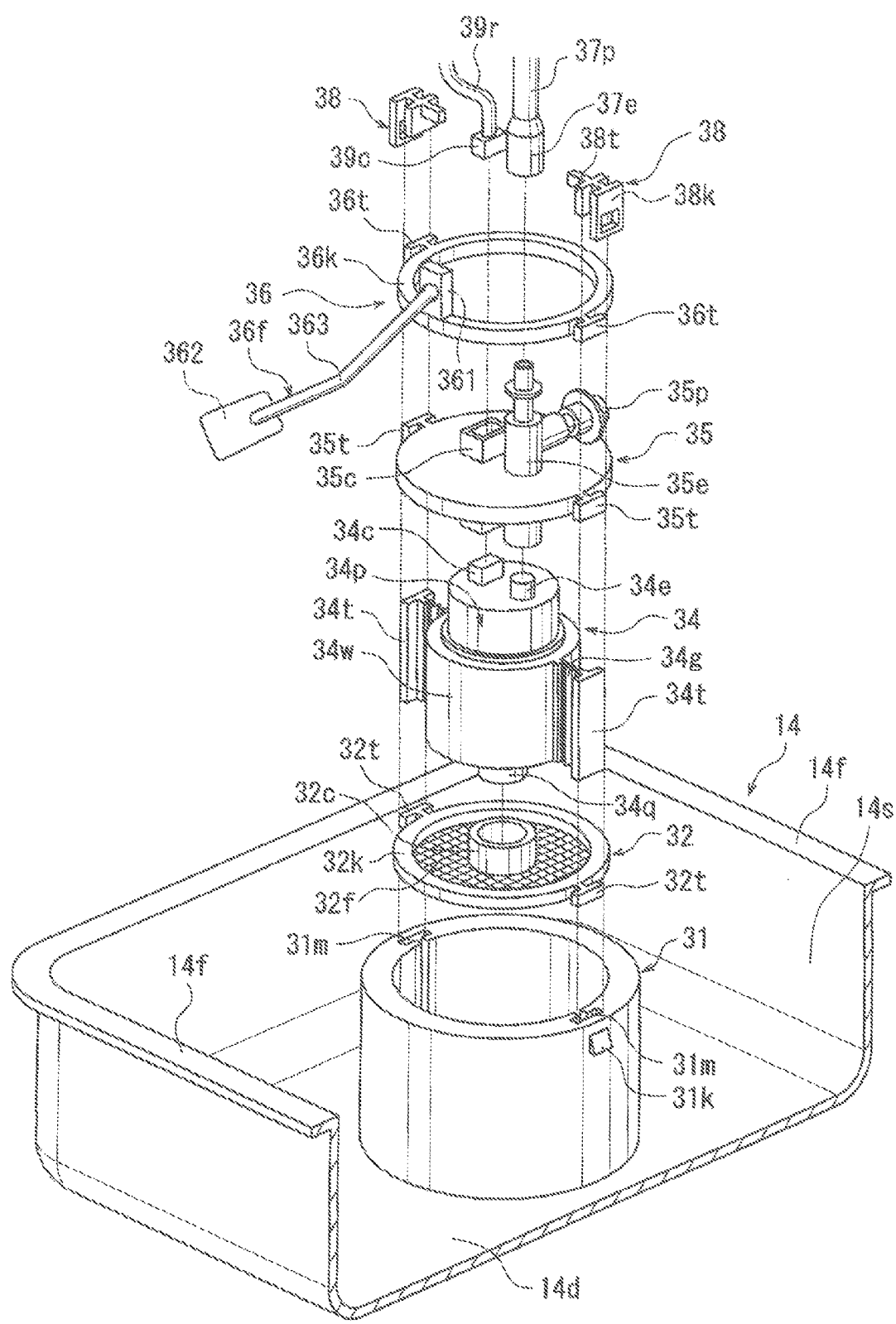
FIG. 3 is an exploded perspective view of a fuel supply device.

The fuel supply device 30 is a device for pressure-feeding fuel stored in the fuel tank body 10m to the engine E, and as illustrated in the exploded perspective view of FIG. 3, is constituted by a cylindrical-shaped reserve cup portion 31, a pump portion 34, a connection plate 35, and a remaining fuel amount detecting portion 36.

The reserve cup portion 31 is formed in a cylindrical container shape in which the upper portion is open, and a through-hole (illustration is omitted) is formed in the lower end portion of the reserve cup portion 31. In addition, the inside and the outside of the reserve cup portion 31 communicate with each other through the through-hole. In addition, a pair of groove portions 31*m* having T-shaped cross-sections are formed at the inner peripheral surface of the reserve cup portion 31 to extend in the vertical direction, and the pair of groove portions 31*m* are positioned at positions opposing each other with the center of the reserve cup portion 31 interposed therebetween.

In addition, at the upper portion of the outer peripheral surface of the reserve cup portion 31, substantially wedge-shaped engaging claws 31*k* are formed at positions that overlap the respective groove portions 31*m*.

The filter portion 32 of the fuel supply device 30 is a filter that filters the fuel suctioned into a fuel pump body 34*p*, and is constituted by an annular body 32*k* and a filter body portion 32*f* formed in a bag shape on the inner side of the annular body 32*k*. The outside diameter dimension of the annular body 32*k* is set to substantially the same dimension as the inside diameter dimension of the reserve cup portion 31 so as to be configured to be stored in the reserve cup portion 31. In addition, at the outer peripheral surface of the annular body 32*k*, T-shaped protrusions 32*t* having T-shaped cross-sections that are able to be fitted into the respective groove portions 31*m* of the reserve cup portion 31 are formed at positions corresponding to the groove portions 31*m*. Moreover, at the center of the upper surface of the filter body portion 32*f* held by the annular body 32*k*, a pipe-like joint portion 32*c* connected to a fuel suctioning port 34*q* of the fuel pump body 34*p* is formed.

The pump portion 34 of the fuel supply device 30 is constituted by the fuel pump body 34*p*, and a pump case 34*w* that stores the fuel pump body 34*p*. At the outer peripheral surface of the pump case 34*w*, supporting elastic plates 34*g* that protrude outward in the radial direction are provided on both sides with the center of the pump case 34*w* interposed to be fitted into the groove portions 31*m* of the reserve cup portion 31 are formed at the protruding ends of the supporting elastic plates 34*g*. As such, the fuel pump body 34*p* and the like are configured to be supported by the supporting elastic plates 34*g*, suppression of vibration of the fuel pump body 34*p* and the like are achieved.

In addition, in the fuel pump body 34*p*, the fuel suctioning port 34*q* described above is provided at the lower surface of a part protruding downward from the pump case 34*w*, and a fuel discharge port 34*e* and a power supply connector 34*c* are provided on the upper surface of a part protruding upward from the pump case 34*w*.

The connection plate 35 of the fuel supply device 30 is a circular plate-like member to which a connector portion 35*c* and a pipe connection joint 35*e* are vertically mounted, and the outside diameter dimension thereof is set to substantially the same dimension as the inside diameter dimension of the reserve cup portion 31. In addition, at the outer peripheral surface of the connection plate 35, T-shaped protrusions 35*t* having T-shaped cross-sections that are able to be fitted into the respective groove portions 31*m* of the reserve cup portion 31 are formed at positions corresponding to the groove portions 31*m* thereof.

In the connector portion 35*c* of the connection plate 35, the power supply connector 34*c* of the fuel pump body 34*p* is connected to a connector lower portion protruding downward from the connection plate 35, and a cable connector 39*c* of a pumping cable 39*r* is connected to a connector upper portion protruding upward from the connection plate 35. Here, the pumping cable 39*r* is connected to a cable assembly 39*x* from an ECU 17 (see FIG. 1) that passes through the cover material 45 (described later) of the opening and closing mechanism 40 via a tank side connector 45*e* (see FIG. 1).

In addition, in the pipe connection joint 35*e* of the connection plate 35, the fuel discharge port 34*e* of the fuel pump body 34*p* is connected to a joint lower portion protruding downward from the connection plate 35, and a pipe connector 37*e* of a fuel pipe 37*p* is connected to a joint upper portion protruding upward from the connection plate 35. Here, the fuel pipe 37*p* is connected to an engine side fuel supply pipe 37*s* that passes through the cover material 45 (described later) of the opening and closing mechanism 40 via a fuel pipe joint 45*f*.

Moreover, a pressure regulator 35*p* for adjusting the pressure of fuel discharged from the fuel discharge port 34*e* of the fuel pump body 34*p* to a predetermined value is attached to the pipe connection joint 35*e* of the connection plate 35.

The remaining fuel amount detecting portion 36 of the fuel supply device 30 is constituted by a level sensor 36*f* that detects the liquid surface level of the fuel, and an annular body 36*k* for positioning the level sensor 36*f* at a predetermined position in the reserve cup portion 31. The outside diameter dimension of the annular body 36*k* is set to substantially the same dimension as the inside diameter dimension of the reserve cup portion 31 so as to be configured to be stored in the reserve cup portion 31. In addition, at the outer peripheral surface of the annular body 36*k*, T-shaped protrusions 36*t* having T-shaped cross-sections that are able to be fitted into the respective groove portions 31*m* of the reserve cup portion 31 are formed at positions corresponding to the groove portions 31*m*. In addition, a sensor body portion 361 of the level sensor 36*f* is fixed to a predetermined position of the upper surface of the annular body 36*k*. In addition, in the sensor body portion 361, the base end portion of an arm 363 including a float 362 is connected to the sensor body portion 361 in a state of being vertically rotatable. Furthermore, a signal line (illustration is omitted) of the level sensor 36*f* is connected to the pumping cable 39*r* via the connector portion 35*c* of the connection plate 35.

In a case of mounting the fuel supply device 30 to the lower lid shell 14, while the T-shaped protrusions 32*t* of the filter portion 32, the T-shaped protruding strips 34*t* of the pump portion 34, the T-shaped protrusions 35*t* of the connection plate 35, and the T-shaped protrusions 36*t* of the remaining fuel amount detecting portion 36 are sequentially fitted into the groove portions 31*m* of the reserve cup portion 31, the filter portion 32, the pump portion 34, the connection plate 35, and the remaining fuel amount detecting portion 36 are sequentially stored in the reserve cup portion 31. At this time, the fuel suctioning port 34*q* of the fuel pump body 34*p* is connected to the joint portion 32*c* of the filter portion 32, and the pipe connection joint 35*e* (the joint lower portion) and the connector portion 35*c* (the connector lower portion) of the connection plate 35 are respectively connected to the fuel discharge portion 34*e* and the power supply connector 34*c* of the fuel pump body 34*p*. Moreover, the signal line of the level sensor 36*f* is connected to the connector portion 35*c* of the connection plate 35. In addition, in a state where the remaining fuel amount detecting portion 36 is finally stored in the reserve cup portion 31, a locking cap 38 is mounted.

Figure 4A:
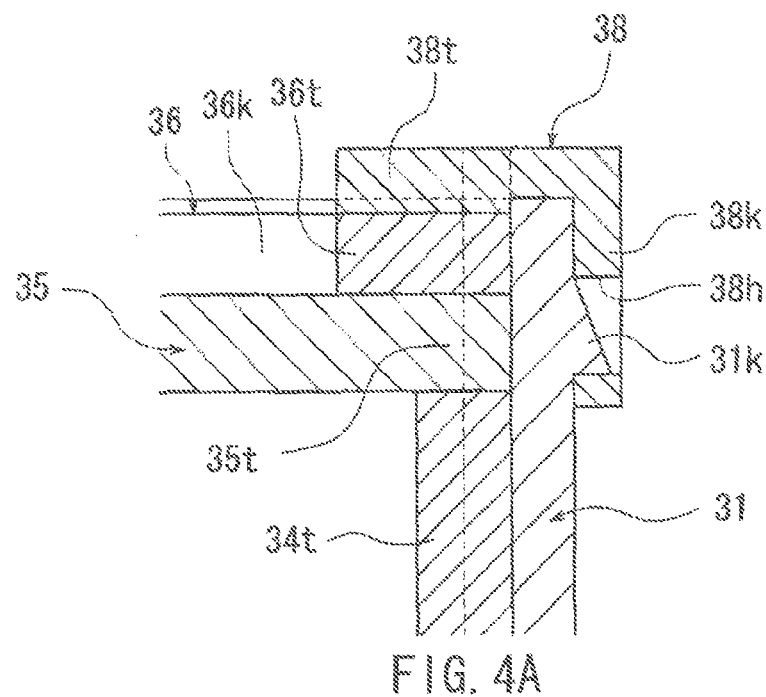
FIGS. 4A and 4B illustrates longitudinal cross-sectional views illustrating an engaging mechanism of the fuel supply device.

The locking cap 38 is a member for achieving locking of the filter portion 32, the pump portion 34, the connection plate 35, and the remaining fuel amount detecting portion 36 in the reserve cup portion 31, and is constituted by locking portions 38*t* press-fitted into the groove portions 31*m* of the reserve cup portion 31 and engaged portions 38k that are able to be engaged with the substantially wedge-shaped engaging claws 31k of the reserve cup portion 31. The engaged portions 38k of the locking cap 38 are plate-like bodies that are elastically deformable in the thickness direction, and as illustrated in FIG. 4A, have square openings 38h at the tip end portions (lower end portions), from which the engaging claws 31k of the reserve cup portion 31 are suspended. Accordingly, in a process in which the locking portions 38t of the locking cap 38 are press-fitted into the groove portions 31m of the reserve cup portion 31, the engaged portions 38k of the locking cap 38 are elastically deformed in the expansion direction while being lowered along the inclined surfaces of the engaging claws 31k of the reserve cup portion 31. In addition, in a stage in which the tip of the engaged portion 38k of the locking cap 38 passes the engaging claw 31k and the square opening 38h of the engaged portion 38k reaches the position of the engaging claw 31k, the engaged portion 38k is returned to its original shape due to the elastic force, and the square opening 38h of the engaged portion 38k is engaged with the engaging claw 31k of the reserve cup portion 31. In this state, locking of the filter portion 32, the pump portion 34, the connection plate 35, and the remaining fuel amount detecting portion 36 in the reserve cup portion 31 is achieved, thereby completing mounting of the fuel supply device 30 to the reserve cup portion 31.

That is, the reserve cup portion 31 corresponds to a device mounting portion of the present invention, and the locking cap 38 and the engaging claws 31k of the reserve cup portion 31 correspond to an engaging mechanism of the present invention. In addition, the remaining fuel amount detecting portion 36 corresponds to a remaining fuel amount detecting device of the present invention.

<Opening Portion 41 of Upper Shell 12 and Opening and Closing Mechanism 40>

Figure 2:
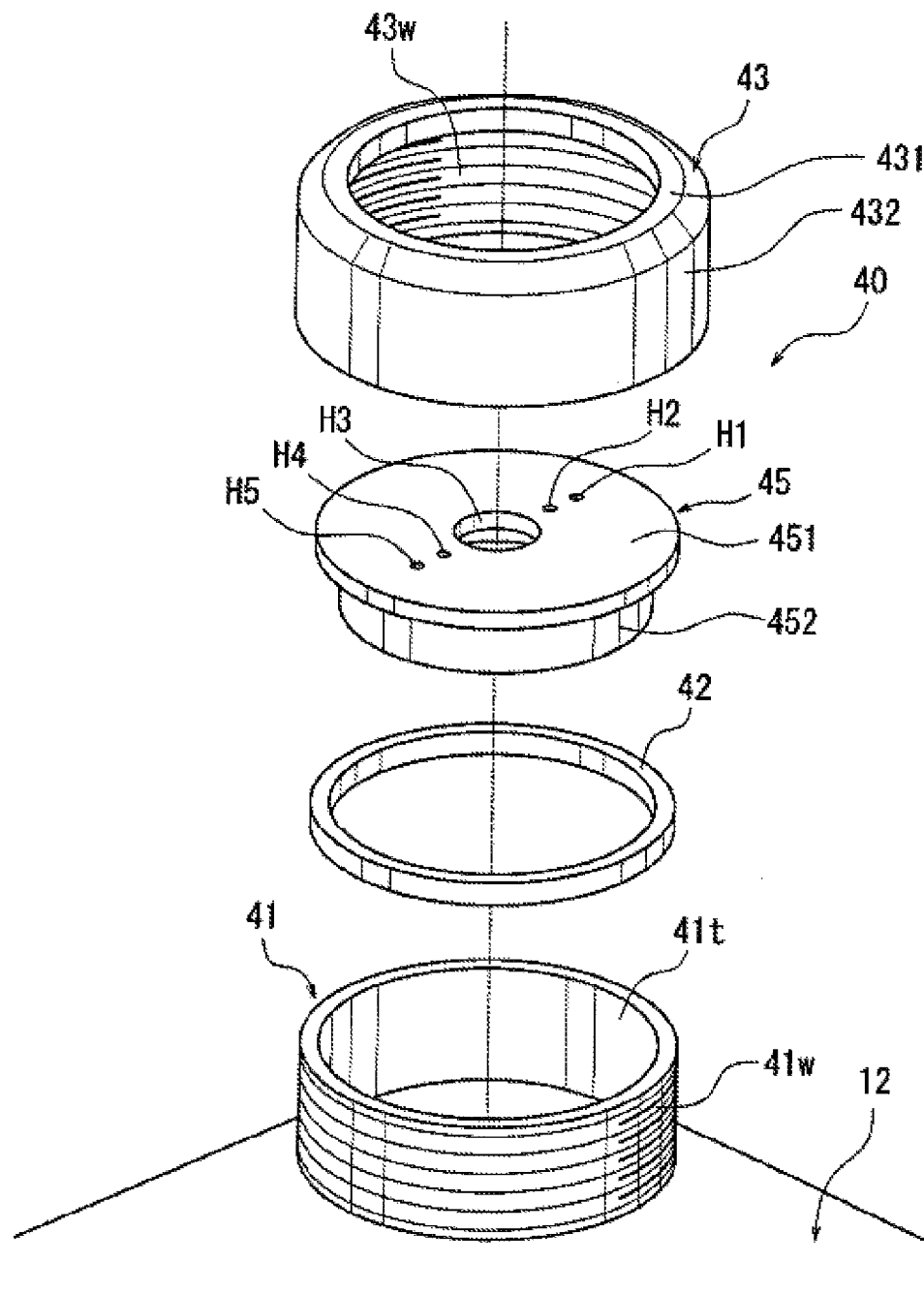
FIG. 2 is a schematic perspective view illustrating a mounting structure of an opening portion of a fuel tank body and a cover material.

As illustrated in FIGS. 1 and 2, the opening portion 41 of the fuel tank body 10m (the upper shell 12) is formed in a short pipe shape having large diameter, and a male screw 41w is formed on the outer peripheral surface thereof. Here, the diameter dimension of an opening hold 41t of the opening portion 41 is set to a dimension through which each constituent component of the fuel supply device 30 described above passes. Therefore, replacement of the components of the fuel supply device 30 may be achieved using the opening portion 41 of the upper shell 12.

The opening and closing mechanism 40 is a mechanism that opens and closes the opening portion 41 of the fuel tank body 10m, and is constituted by the circular plate-like cover material 45, a packing 42, and a cover pressing ring 43.

As illustrated in FIG. 2, the cover material 45 includes a circular plate portion 451 that blocks the opening portion 41, and a cylindrical portion 452 that is formed on the rear surface of the circular plate portion 451 and is inserted into the opening hole 41t of the opening portion 41, and the circular plate portion 451 and the cylindrical portion 452 are coaxially formed. In the circular plate portion 451 of the cover material 45, a through-hole H3 for mounting an inlet portion 50 (see FIG. 1) is formed at the substantially center position, and an inlet pipe (illustration is omitted) that guides fuel from a fueling port of the vehicle to the fuel tank body 10m is connected to the inlet portion 50. In addition, in the vicinity of the through-hole H3 for the inlet portion 50, a through hole (illustration is omitted) is formed for mounting a breather port to which a breather hose for releasing gas in the fuel tank body 10m to the outside during fueling is connected.

In addition, in the circular plate portion 451 of the cover material 45, a through-hole H1 for mounting the tank side atmosphere port 45a to which the atmosphere pipe 19 of the canister 20 is connected, and a through-hole H2 for mounting the tank side purge port 45p to which the purge pipe 18t of the same canister 20 is connected are formed. Here, in a system in which the tip of the atmosphere pipe 19 is connected to the vicinity of the fueling port of the vehicle, by integrating the atmosphere pipe 19 and the inlet portion 50 to a position of the cover material 45, construction of the atmosphere pipe 19 from the fuel tank 10 to the above-mentioned fueling port is facilitated.

Moreover, in the circular plate portion 451 of the cover material 45, a through-hole H4 through which the engine side fuel supply pipe 37s passes, and a through-hole H5 through which the cable assembly 39x passes are formed.

In addition, sealing between the above-described through-hole H1 to H5, the tank side purge port 45p, the tank side atmosphere port 45a, the engine side fuel supply pipe 37s, the cable assembly 39x, and the like are performed by corresponding sealing materials (illustration is omitted).

The packing 42 is set to have a diameter dimension through which the cylindrical portion 452 of the cover material 45 is able to be inserted, in interposed between the peripheral edge of the rear surface of the circular plate portion 451 of the cover material 45 and the tip surface of the opening portion 41, and as illustrated in FIG. 1, is configured to be able to perform sealing between the cover material 45 and the opening portion 41.

The cover pressing ring 43 is a member that holds the cover material 45 on the opening portion 41, and as illustrated in FIG. 2, is constituted by a cylindrical portion 432 and an inner flange portion 431 is formed to have such a diameter dimension to press the peripheral edge of the surface side of the circular plate portion 451 of the cover material 45. In addition, on the inner peripheral surface of the cylindrical portion 432 of the cover pressing ring 43, a female screw 43w that is able to be screwed to the male screw 41w of the opening portion 41 is formed.

Therefore, in a state where the packing 42 is set in the periphery of the cylindrical portion 452 of the cover of the cover material 45, the cylindrical portion 452 of the cover material 45 is inserted into the opening hole 41t of the opening portion 41 of the fuel tank body 10m, and in this state, the female screw 43w of the cover pressing ring 43 is fastened by being screwed to the male screw 41w of the cylindrical portion 452, thereby blocking the opening portion 41 of the fuel tank body 10m.

<Advantages of Fuel Tank 10 According to this Embodiment>

According to the fuel tank 10 according to this embodiment, in the cover material 45 that blocks the opening portion 41 of the fuel tank body 10m, the inlet portion 50 to which the inlet pipe (illustration is omitted) is connected, the engine side fuel supply pipe 37s (pipe) and the cable assembly 39x (wire) of the fuel supply device 30, the tank side purge port 45p and the tank side atmosphere port 45a (pipe) of the canister 20 are fixed in a state of penetrating the cover material 45. Therefore, sealing between the joining portion between the opening portion 41 of the fuel tank body 10m and the cover material 45, and the portion of the cover material 45 penetrated by the above-mentioned pipes and wires may be performed. That is, the sealing points are integrated into one point of the opening portion 41 of the fuel tank body 10m. Therefore, compared to a case where a plurality of sealing points are distributed as in the related art, reliability of the fuel tank 10 is enhanced, and reduction in cost may be achieved.

In addition, the size of the opening portion 41 of the fuel tank body 10m is formed to be a size through which the components mounted into the fuel tank body 10m pass, and the cover material 45 is configured to be removable from the opening portion 41 and re-mountable thereto. Therefore, replacement of the components in the fuel tank body 10m may be performed using the opening portion 41, and thus an opening for maintenance does not need to be particularly provided.

In addition, the fuel supply device 30 is mounted to the reserve cup portion 31 (device mounting portion) formed on the inner wall surface of the fuel tank body 10m by an engagement action between the locking cap 38 and the engaging claws 31k (engaging mechanisms) of the reserve cup portion 31. Therefore, mounting of the fuel supply device 30 to the fuel tank body 10m is facilitated.

In addition, a part of the container 21 of the canister 20 included in a fuel vapor treating device is molded integrally with the wall portion of the fuel tank body 10m. Therefore, reduction in manufacturing cost of the fuel tank 10 may be achieved.

In addition, since the upper shell 12 and the lower shell 14 are resin injection-molded products, the upper shell 12 and a part of the canister 20 may be integrally molded, or the lower shell 14 and a part of the fuel supply device 30 may be integrally molded.

Modification Example

Figure 4B:
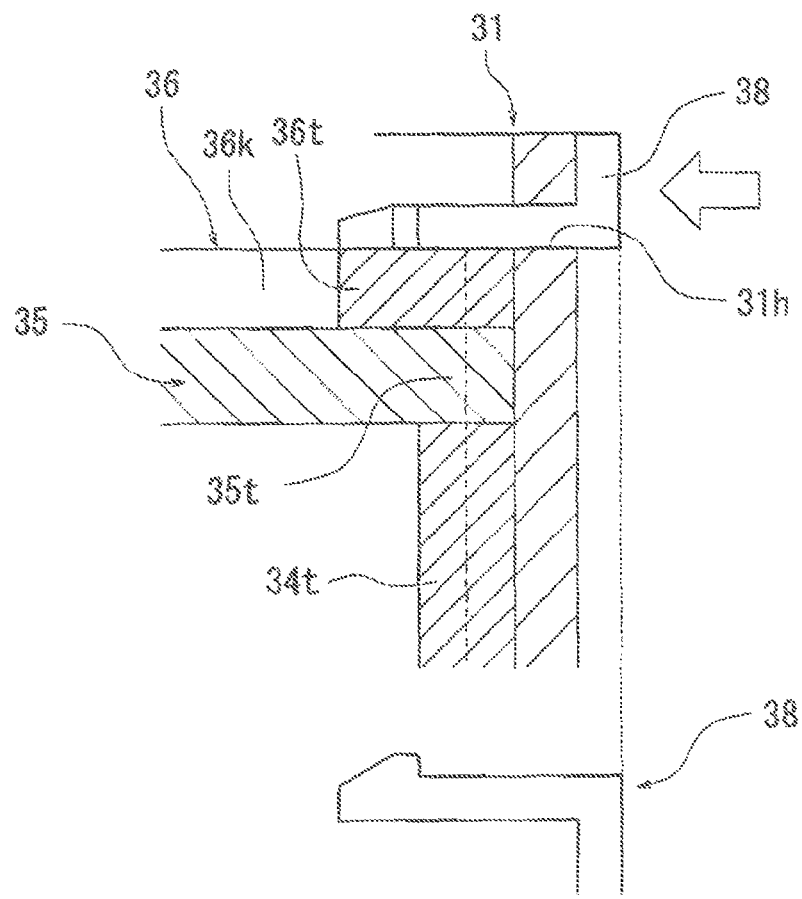

Here, the present invention is not limited to the above-described embodiment, and may be modified in a scope that does not depart from the gist of the present invention. For example, in the fuel tank 10 according to this embodiment, an example in which, by elastically engaging the engaged portions 38k of the locking cap 38 with the engaging claws 31k of the reserve cup portion 31, locking of the filter portion 32, the pump portion 34, the connection plate 35, and the remaining fuel amount detecting portion 36 in the reserve cup portion 31 is achieved is illustrated. However, as illustrated in FIG. 4B, a configuration in which an opening 31h is formed in the upper portion of the side surface of the reserve cup portion 31, a locking member 38 is inserted in the transverse direction from the opening 31h, and the annular body 36k of the remaining fuel amount detecting portion 36 is pressed from above at the tip portion of the locking member 38 protruding from the inner peripheral surface of the reserve cup portion 31 is possible.

Figure 5:
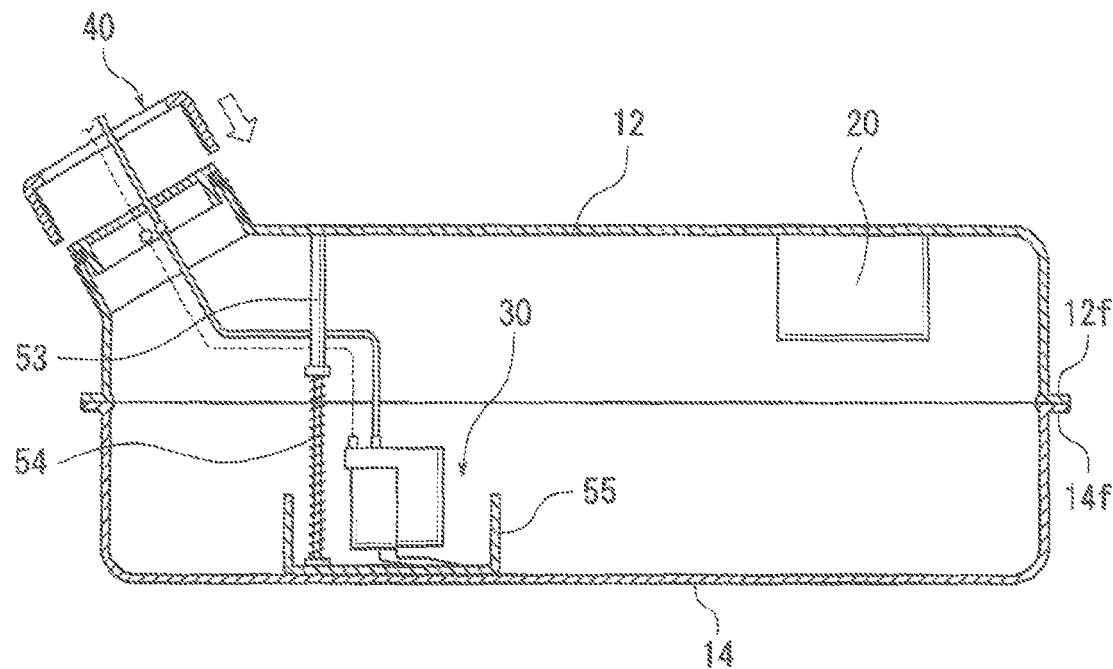
FIG. 5 is a schematic longitudinal cross-sectional view of a fuel tank body of a fuel tank according to a modification example of Embodiment 1.

In addition, in the fuel tank 10 according to this embodiment, an example in which the fuel supply device 30 is fixed to the bottom plate portion 14d of the lower shell 14 is illustrated. However, as illustrated in FIG. 5, a configuration in which the fuel supply device 30 is supported to be hung from the upper shell 12 by a support column 53 is possible. Here, a spring material 54 is attached to the support column 53, and the spring material 54 is impelled to press down a reserve cup portion 55 of the fuel supply device 30. Accordingly, the reserve cup portion 55 is always pressed against the bottom plate portion 14d of the lower shell 14 by the spring force of the spring material 54.

As such, since the fuel supply device 30 is not mounted to the lower shell 14, the shape of the lower shell 14 may be relatively freely set. Therefore, fuel tanks having different shapes may be easily manufactured.

Figure 6:
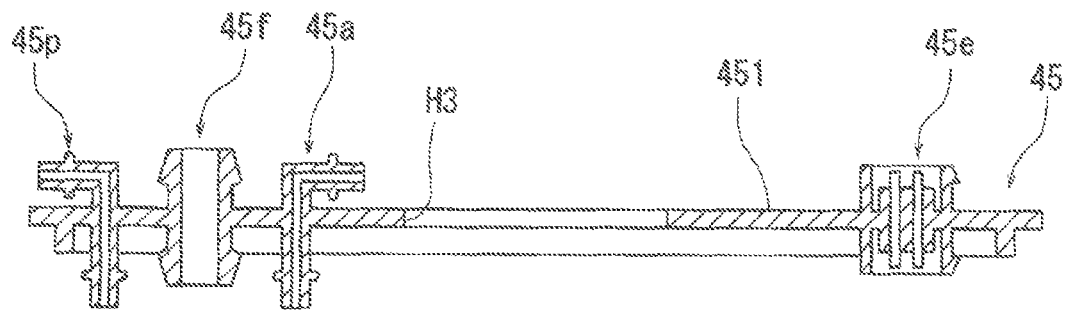
FIG. 6 is a longitudinal cross-sectional view of a cover material of a fuel tank according to a modification example of Embodiment 1.

In addition, in this embodiment, as illustrated in FIGS. 1 and 2, an example in which the through-holes H1 and H2 are formed in the cover material 45 of the opening and closing mechanism 40 to mount the tank side atmosphere port 45a and the tank side purge port 45p, the engine side fuel supply pipe 37s passes through the through-hole H4, and the cable assembly 39x passes through the through-hole H5 is illustrated. However, as illustrated in FIG. 6, the tank side atmosphere port 45a and the tank side purge port 45p may be integrated with the cover material 45, the fuel pipe joint 45f to which the engine side fuel supply pipe 37s is connected may be formed at the position of the through-hole H4, and the tank side connector 45e to which the cable assembly 39x is connected may be provided at the position of the through-hole H5.

Figure 7:
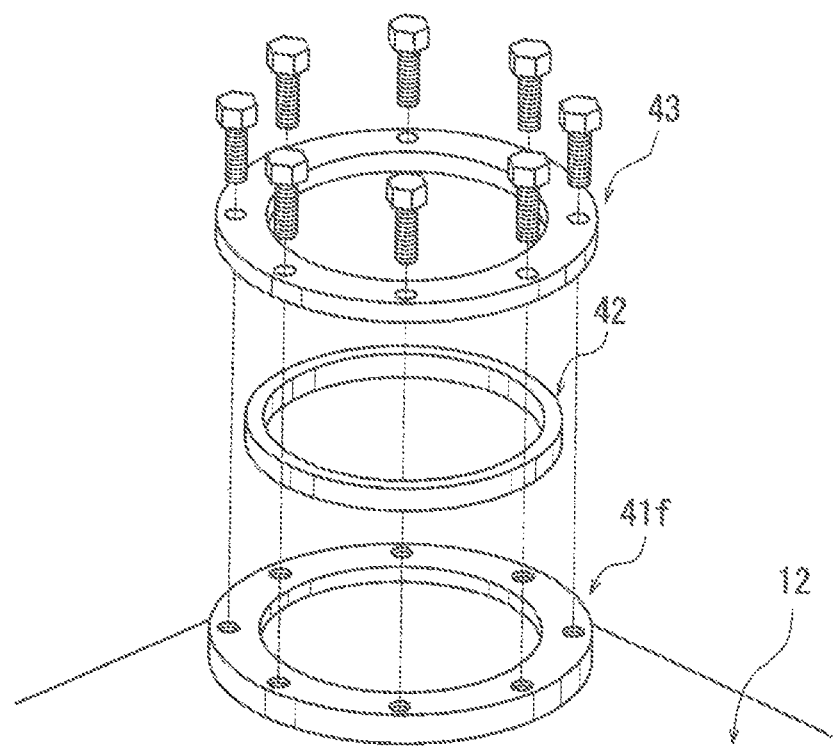
FIG. 7 is a schematic perspective view illustrating a mounting structure of a cover material of a fuel tank according to a modification example of Embodiment 1.
Figure 8:
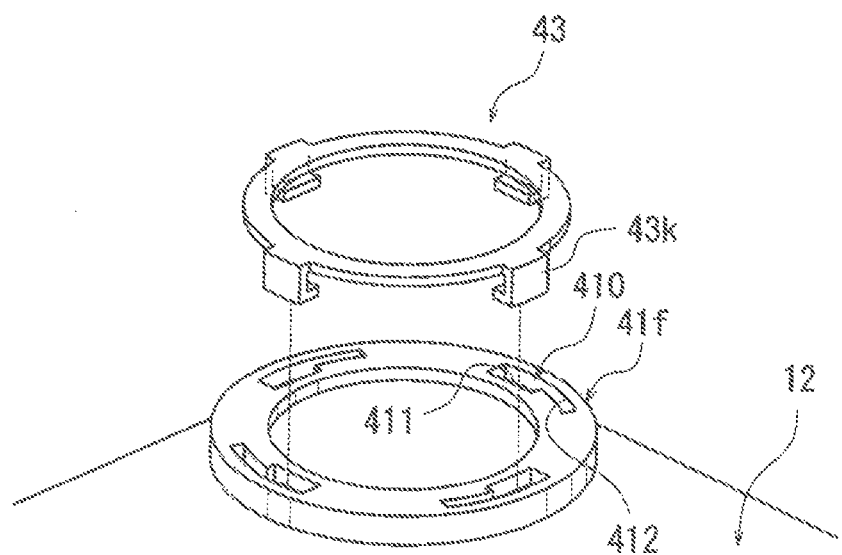
FIG. 8 is a schematic perspective view illustrating a mounting structure of a cover material of a fuel tank according to a modification example of Embodiment 1.
Figure 9:
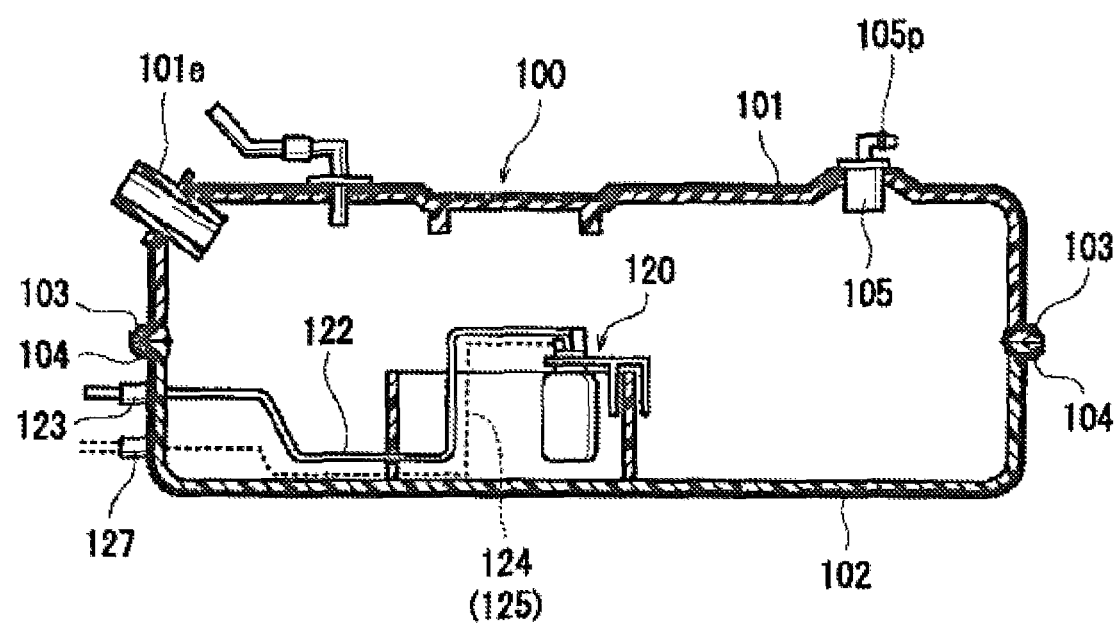
FIG. 9 is a schematic longitudinal cross-sectional view of a fuel tank according to the related art.

In addition, in this embodiment, an example in which the opening and closing mechanism 40 that opens and closes the opening portion 41 of the fuel tank body 10m is constituted by the cover material 45, the cover pressing ring 43, and the like is illustrated. However, as illustrated in FIG. 7, a configuration in which a flange portion 41f is formed on the opening portion 41 side, and the cover material 45 (omitted in FIG. 7) is pressed by the ring-shaped pressing flange 43 is possible. Moreover, a configuration in which the cover material 45 is formed in a flange plate shape, and the flange plate-shaped cover material 45 and the flange portion 41f on the opening portion 41 side are directly fastened through bolt and nut fastening is possible. In addition, as illustrated in FIG. 8, a configuration in which the flange portion 41f on the opening portion 41 side and the ring-shaped pressing flange 43 are fastened by an engagement action between a plurality of hook portions 43k and a plurality of hook receiving holes 410 is possible. That is, the hook receiving hole 410 is formed as an arc coaxially with the center of the opening portion 41 (the flange portion 41f), and includes an insertion portion 411 through which the hook portion 43k passes and a slit portion 412 from which the hook portion 43k is suspended. In addition, in a state where the hook portion 43k passes through the insertion portion 411 of the hook receiving hole 410, the pressing flange 43 is rotated about the flange portion 41f on the opening portion 41 side so that the hook portion 43k is moved to the position of the slit portion 412, thereby connecting the flange portion 41f on the opening portion 41 side to the pressing flange 43. In addition, in FIG. 8, the cover material 45 and the packing 42 are omitted.

In addition, in this embodiment, an example in which the atmosphere port 20a, the purge port 20p, and the tank port 20t of the canister 20 are provided inside the fuel tank body 10m is illustrated. However, the ports 20a, 20p, and 20t may be provided outside the fuel tank body 10m. In this case, it is preferable that the vapor pipe 15 that causes the tank port 20t of the canister 20 and the inside of the fuel tank body 10m to communicate with each other pass through the cover material 45 of the opening and closing mechanism 40.

The invention claimed is:

1. A fuel tank comprising:
   a fuel supply device for pressure-feeding a fuel to an engine of a vehicle;
   a fuel vapor treating device configured to enable adsorption of fuel vapor;
   a fuel tank body which stores the fuel and has an opening through which an internal space and an external space of the fuel tank body are communicated with each other, the opening being the only opening in the fuel tank body;
   a cover material that blocks the opening;

wherein the fuel vapor treating device is disposed within the fuel tank body and includes a canister container containing an adsorbent;
wherein the canister container includes a wall that faces the internal space of the fuel tank body;
wherein the wall of the canister container includes an atmosphere port, a purge port, and a tank port;
wherein the cover material includes:
an inlet pipe penetrating portion through which the fuel from a fueling port is introduced into the fuel tank via an inlet pipe;
a fuel supply pipe penetrating portion through which the fuel in the fuel tank is supplied to the engine via a fuel supply pipe;
an atmospheric pipe penetrating portion through which the atmosphere port is connected to an atmosphere via an atmospheric pipe;
a purge pipe penetrating portion through which the purge port is connected to the engine via a purge pipe; and
a cable penetrating portion through which the fuel supply device is connected to an engine control unit (ECU) of the vehicle via a cable;
wherein the inlet pipe is sealingly engaged with the inlet pipe penetrating portion, the fuel supply pipe is sealingly engaged with the fuel supply pipe penetrating portion, the atmospheric pipe is sealingly engaged with the atmospheric pipe penetrating portion, the purge pipe is sealingly engaged with the purge pipe penetrating portion, and the cable is sealingly engaged with the cable penetrating portion; and
wherein the cover material is sealingly engaged with the fuel tank body.

2. The fuel tank according to claim 1,
wherein a size of the opening of the fuel tank body is formed to be a size through which a component mounted into the fuel tank body passes, and
the cover material is configured to be demountable from the opening and re-mountable thereto.

3. The fuel tank according to claim 1,
wherein a remaining fuel amount detecting device included in the fuel supply device is installed in the fuel tank body, and
wherein a signal line of the remaining fuel amount detecting device is fixed to the cover material and penetrates the cable penetrating portion of the cover material.

4. The fuel tank according to claim 1,
wherein an entirety of the fuel supply device is installed in the fuel tank body.

5. The fuel tank according to claim 1,
wherein the fuel supply device is mounted to a device mounting portion formed on an inner wall surface of the fuel tank body by an engaging mechanism.

6. The fuel tank according to claim 1,
wherein a part of the canister container is molded integrally with a wall portion of the fuel tank body.

7. The fuel tank according to claim 1,
wherein the fuel tank body is constituted by an upper shell and a lower shell, and
the fuel supply device and the fuel vapor treating device are mounted to the upper shell.

8. The fuel tank according to claim 1,
wherein the fuel tank body is constituted by an upper shell and a lower shell; and
wherein the upper shell and the lower shell are resin injection-molded products.

9. The fuel tank according to claim 1, wherein the fuel supply pipe penetrating portion and the atmospheric pipe penetrating portion are integrated with the cover material.

10. The fuel tank according to claim 1, wherein the wall is a bottom of the canister container.

11. A fuel tank, comprising:
a fuel supply device for pressure-feeding a fuel to an engine of a vehicle;
a fuel vapor treating device configured to enable adsorption of the fuel vapor;
a fuel tank body configured to store the fuel and having an opening through which an internal space and an external space of the fuel tank body are communicated with each other, the opening being the only opening in the fuel tank body; and
a cover material that blocks the opening of the fuel tank body;
wherein the fuel vapor treating device is disposed within the fuel tank body and includes a canister container filled with an adsorbent;
wherein the canister container of the fuel vapor treating device includes an atmosphere port, a purge port, and a tank port, each of which is directed from an inside of the canister container to the internal space of the fuel tank body;
wherein the cover material includes:
an inlet pipe penetrating portion through which the fuel from a fueling port is introduced into the fuel tank via an inlet pipe;
a fuel supply pipe penetrating portion through which the fuel in the fuel tank is supplied to the engine via a fuel supply pipe;
an atmospheric pipe penetrating portion through which the atmosphere port of the canister container is connected to an atmosphere via an atmospheric pipe;
a purge pipe penetrating portion through which the purge port is connected to the engine via a purge pipe; and
a cable penetrating portion through which the fuel supply device is connected to an engine control unit (ECU) of the vehicle via a cable; and
wherein the inlet pipe is sealingly engaged with the inlet pipe penetrating portion, the fuel supply pipe is sealingly engaged with the fuel supply pipe penetrating portion, the atmospheric pipe is sealingly engaged with the atmospheric pipe penetrating portion, the purge pipe is sealingly engaged with the purge pipe penetrating portion, and the cable is sealingly engaged with the cable penetrating portion; and
wherein the cover material is sealingly engaged with the fuel tank body.

* * * * *